(12) United States Patent
Yan et al.

(10) Patent No.: US 12,157,931 B2
(45) Date of Patent: Dec. 3, 2024

(54) METHOD FOR CO-EXTRACTION OF VANADIUM, TITANIUM AND CHROMIUM FROM VANADIUM SLAG

(71) Applicant: University of Science and Technology Beijing, Beijing (CN)

(72) Inventors: Baijun Yan, Beijing (CN); Zihui Dong, Beijing (CN); Jie Zhang, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 275 days.

(21) Appl. No.: 17/740,091

(22) Filed: May 9, 2022

(65) Prior Publication Data
US 2022/0356543 A1    Nov. 10, 2022

(30) Foreign Application Priority Data
May 10, 2021   (CN) .......................... 202110505582.9

(51) Int. Cl.
| | | |
|---|---|---|
| C22B 7/04 | (2006.01) | |
| C22B 7/00 | (2006.01) | |
| C22B 34/12 | (2006.01) | |
| C22B 34/22 | (2006.01) | |
| C22B 34/32 | (2006.01) | |

(52) U.S. Cl.
CPC ................ C22B 7/04 (2013.01); C22B 7/007 (2013.01); C22B 34/1213 (2013.01); C22B 34/1281 (2013.01); C22B 34/1286 (2013.01); C22B 34/22 (2013.01); C22B 34/32 (2013.01)

(58) Field of Classification Search
CPC ....... C22B 7/04; C22B 7/007; C22B 34/1213; C22B 34/1281; C22B 34/1286; C22B 34/22; C22B 34/32; C22B 3/06; C22B 3/165; C22B 7/002; C22B 4/124; C22B 34/1259; C22B 1/005; C22B 3/16; C22B 34/12; C22B 34/124; Y02P 10/20

USPC .......................................................... 75/613
See application file for complete search history.

(56) References Cited

U.S. PATENT DOCUMENTS

2020/0131600 A1*  4/2020  Connelly ................. C22B 3/10

FOREIGN PATENT DOCUMENTS

CN          111041200 A  *  4/2020  ............. C22B 3/165

OTHER PUBLICATIONS

CN-111041200-A Translation (Year: 2020).*
Li et al., An Effective and Cleaner Process to Recover Iron, Titanium, Vanadium, and Chromium from Hongge Vanadium Titanomagnetite with Hydrogen-Rich Gas, Ironmaking and steelmaking, vol. 48, No. 1, p. 33-39, Jan. 21, 2021 (Year: 2021).*

* cited by examiner

Primary Examiner — Brian D Walck
Assistant Examiner — Danielle M. Carda
(74) Attorney, Agent, or Firm — Fish IP Law, LLP

(57) ABSTRACT

The present disclosure provides a method for co-extraction of vanadium, titanium and chromium from vanadium slag. The method selectively reduces pyroxene and fayalite wrapped on spinel through low-temperature hydrogen reduction, iron removal by ferric chloride, and low-temperature leaching of the vanadium slag by oxalic acid, thereby destroying a structure of the spinel, dissociating a spinel phase and a silicate phase, and fully exposing the spinel phase. The method also directly leaches the vanadium slag at a low temperature by acidity and strong complexation of the oxalic acid, and destroys the structure of the spinel, such that vanadium, titanium, chromium and oxalate are complexed into a solution to co-extract vanadium, titanium and chromium. The present disclosure extracts vanadium, titanium and chromium from the vanadium slag, with a leaching rate each being greater than 99%.

9 Claims, No Drawings

METHOD FOR CO-EXTRACTION OF VANADIUM, TITANIUM AND CHROMIUM FROM VANADIUM SLAG

CROSS REFERENCE TO RELATED APPLICATION

This patent application claims the benefit and priority of Chinese Patent Application No. 202110505582.9, filed on May 10, 2021, the disclosure of which is incorporated by reference herein in its entirety as part of the present application.

TECHNICAL FIELD

The present disclosure relates to the technical field of recycling of metallurgical slag, in particular to a method for co-extraction of vanadium, titanium and chromium from vanadium slag.

BACKGROUND ART

Vanadium slag, as a by-product of vanadium titanomagnetite smelting, is rich in rare metal elements such as vanadium, titanium and chromium. At present, the vanadium slag is only used for vanadium extraction, which involves sodium salt roasting-water extraction and calcium roasting-vanadium extraction by acid leaching.

The sodium salt roasting-water extraction mainly includes the following steps: sodium salt roasting, water leaching, solution purification, and vanadium precipitation by ammonium salt. However, this technique has a complicated process, and requires high-temperature roasting (850° C.) to achieve vanadium extraction. Moreover, this technique can only extract vanadium with a relatively low vanadium recovery rate of generally less than 80%, and cannot extract titanium and chromium. Furthermore, this technique has a relatively high emission load of industrial wastewater, waste gases and residues.

The calcium roasting-vanadium extraction by acid leaching mainly includes the following steps: calcium roasting, acid leaching, solution purification, and vanadium precipitation by ammonium salt. However, this technique has a complicated process flow, and requires high-temperature roasting (850° C.) to achieve vanadium extraction. Moreover, this technique has a vanadium recovery rate generally lower than that of vanadium extraction by sodium salt roasting, and has a high requirement on a grade of the vanadium slag. Furthermore, although avoiding waste gas and wastewater generated by the sodium salt roasting, this technique cannot jointly extract titanium and chromium, and may discharge toxic tailings.

The patent CN201911129723.0 disclosed a method for leaching vanadium, titanium and chromium from raw materials containing vanadium, titanium and chromium with an organic acid by a hydrothermal method. This technique realizes the co-extraction of vanadium, titanium and chromium by direct leaching of the vanadium slag with high-concentration oxalic acid under high temperature and high pressure, while avoiding the industrial wastewater, waste gases and residues. However, this technique is conducted at a high temperature, high pressure and high acidity, with a relatively high requirement for equipment. Therefore, it is necessary to develop a method for directly leaching vanadium, titanium and chromium from the vanadium slag with oxalic acid at a low temperature, low pressure and low concentration.

SUMMARY

Based on the mineral characteristics of vanadium slag, the present disclosure analyzes a root cause that vanadium can only be extracted from the vanadium slag with a relatively low recovery rate in the prior art. In view of this, the present disclosure provides a method for leaching the vanadium slag through low-temperature reduction, iron removal by ferric chloride, and low-temperature leaching of the vanadium slag by oxalic acid, thereby simultaneously extracting vanadium, titanium and chromium. The method includes the following steps:

(1) subjecting vanadium slag to a reduction reaction in a high-temperature reaction furnace to obtain a reduction material;

(2) conducting an iron removal reaction on the reduction material with a certain amount of a ferric chloride aqueous solution in a reaction kettle, and filtering, washing and drying after the reaction is completed to obtain an iron-removed product; and (3) conducting a leaching reaction on the iron-removed product with a certain amount of an oxalic acid solution in the reaction kettle, and filtering and washing after the reaction is completed to obtain a leaching solution and leaching residue of vanadium, titanium and chromium.

Further, in step (1), the vanadium slag may be one or two selected from the group consisting of high-grade vanadium slag and low-grade vanadium slag.

Further, in step (1), the vanadium slag may have a particle size of 100 mesh to 500 mesh, preferably 200 mesh to 250 mesh.

Further, in step (1), the reduction reaction may be conducted at 600° C. to 1,000° C. for 30 min to 150 min, preferably at 800° C. to 900° C. for 60 min to 90 min.

Further, in step (1), the reduction reaction may be one of hydrogen reduction reaction, carbon reduction reaction, and carbon monoxide reduction reaction.

Further, the hydrogen reduction reaction may have a hydrogen flow rate of 50 mL/min to 300 mL/min, preferably 100 mL/min to 200 mL/min; the carbon reduction reaction may have a carbon addition amount of 8% to 20%, preferably 10% to 15% of the vanadium slag; and the carbon monoxide reduction reaction may have a carbon monoxide flow rate of 70 mL/min to 400 mL/min, preferably 200 mL/min to 250 mL/min.

Further, in step (2), the ferric chloride aqueous solution may have a concentration of 200 g/L to 600 g/L, and the ferric chloride aqueous solution and the reduction material may have a liquid-to-material ratio of (4-10) mL:1 g; and the iron removal reaction may be conducted at 50° C. to 90° C. and 200 r/min to 400 r/min for 30 min to 50 min.

Further, in step (2), the ferric chloride aqueous solution may have the concentration of 400 g/L to 500 g/L, and the ferric chloride aqueous solution and the reduction material may have the liquid-to-material ratio of (4-10) mL:1 g; and the iron removal reaction may be conducted at 60° C. to 70° C. and 350 r/min to 400 r/min for 30 min to 50 min.

Further, in step (3), the oxalic acid solution may have a concentration of 5% to 15%, and the oxalic acid solution and the iron-removed product may have a liquid-to-material ratio of (4-10) mL:1 g; and the leaching reaction may be conducted at 40° C. to 100° C., 0 MPa to 1 MPa and 100 r/min to 500 r/min for 30 min to 120 min.

Further, in step (3), the oxalic acid solution may have the concentration of 5% to 15%, and the oxalic acid solution and the iron-removed product may have the liquid-to-material ratio of (6-8) mL:1 g; and the leaching reaction may be conducted at 70° C. to 80° C., 0.1 MPa to 1 MPa and 300 r/min to 350 r/min for 30 min to 120 min.

The vanadium slag has a mineral phase mainly including vanadium spinel, fayalite and pyroxene phases; and vanadium, titanium, and chromium are stored in the spinel phase that is surrounded by the fayalite and pyroxene phases. The traditional methods add sodium salts or calcium salts at high temperature to destroy a structure of the vanadium spinel, converting vanadium into soluble vanadates to achieve vanadium extraction. However, the vanadium spinel wrapped by the fayalite and pyroxene is difficult to use, and high temperature may further melt silicates, resulting in more serious "wrapping". Therefore, it is difficult to achieve efficient extraction of vanadium. Moreover, due to a stable structure, it is difficult to destroy titanium-chromium spinel at high temperature, such that the co-extraction of titanium and chromium cannot be achieved during the vanadium extraction.

Compared with the prior art, the present disclosure has the following beneficial technical effects.

By studying physicochemical properties of the spinel phase, the fayalite phase, and the pyroxene phase, pyroxene and fayalite wrapped around spinel are selectively reduced by a low-temperature reduction method, thereby destroying the spinel structure to break the "wrapping". Iron is efficiently leached by ferric chloride, achieving dissociation of the spinel phase and the silicate phase, such that the spinel phase is fully exposed. The vanadium slag is directly leached at a low temperature by acidity and strong complexation of the oxalic acid, to destroy the spinel structure, such that vanadium, titanium, chromium and oxalate are complexed into a solution to co-extract vanadium, titanium, and chromium.

The present disclosure extracts vanadium, titanium, and chromium from the vanadium slag, with a leaching rate each being greater than 99%.

DETAILED DESCRIPTION OF THE EMBODIMENTS

Example 1

(1) 5 g of vanadium slag was placed in a high-temperature tubular furnace for hydrogen reduction at 700° C. and a hydrogen flow rate of 100 mL/min for 80 min, and hydrogen-reduced vanadium slag was cooled to room temperature with the furnace.

(2) 2 g of the hydrogen-reduced vanadium slag and 20 mL of a ferric chloride solution with a concentration of 500 g/L were placed in a reaction kettle for a leaching reaction at 60° C. and 400 r/min for 40 min; and iron-removed vanadium slag was filtered, washed and dried.

(3) 1.5 g of the iron-removed vanadium slag, 1.48 g of oxalic acid, and 15 mL of deionized water were mixed well into a slurry, and the slurry was added into the reaction kettle for a reaction at 75° C., 0.02 MPa, and 300 r/min for 60 min; a reaction product was cooled to room temperature, filtered and washed to obtain a leaching solution and a leaching residue of vanadium, titanium and chromium.

The results show that the vanadium slag has a vanadium leaching rate of 98.1%, a titanium leaching rate of 98.4%, and a chromium leaching rate of 97.6%.

Example 2

(1) 5 g of vanadium slag and 18% of a carbon powder were placed in a high-temperature tubular furnace for reduction at 800° C. for 100 min, and reduced vanadium slag was cooled to room temperature with the furnace.

(2) 2 g of the reduced vanadium slag and 20 mL of a ferric chloride solution with a concentration of 600 g/L were placed in a reaction kettle for a leaching reaction at 500 r/min for 60 min; and iron-removed vanadium slag was filtered, washed and dried.

(3) 1 g of the iron-removed vanadium slag, 1.11 g of oxalic acid, and 10 mL of deionized water were mixed well into a slurry, and the slurry was added into the reaction kettle for a reaction at 85° C., 0.03 MPa, and 300 r/min for 60 min; a reaction product was cooled to room temperature, filtered and washed to obtain a leaching solution and a leaching residue of vanadium, titanium and chromium.

The results show that the vanadium slag has a vanadium leaching rate of 99.5%, a titanium leaching rate of 99.4%, and a chromium leaching rate of 99%.

Example 3

(1) 5 g of vanadium slag was placed in a high-temperature tubular furnace for reduction at 900° C. and a carbon monoxide flow rate of 100 mL/min for 120 min, and reduced vanadium slag was cooled to room temperature with the furnace.

(2) 2 g of the reduced vanadium slag and 20 mL of a ferric chloride solution with a concentration of 500 g/L were placed in a reaction kettle for a leaching reaction at 500 r/min for 60 min; and iron-removed vanadium slag was filtered, washed and dried.

(3) 1 g of the iron-removed vanadium slag, 1.76 g of oxalic acid, and 10 mL of deionized water were mixed well into a slurry, and the slurry was added into the reaction kettle for a reaction at 100° C., 0.1 MPa, and 400 r/min for 60 min; a reaction product was cooled to room temperature, filtered and washed to obtain a leaching solution and a leaching residue of vanadium, titanium and chromium.

The results show that the vanadium slag has a vanadium leaching rate of 99.8%, a titanium leaching rate of 99.7%, and a chromium leaching rate of 99.5%.

Comparative Example 1

Vanadium was extracted by traditional sodium salt roasting and calcium roasting. The results show that these methods can only achieve vanadium extraction with a final extraction rate of less than 80%.

Comparative Example 2

Vanadium, titanium, and chromium were extracted by a method provided in patent CN201911129723.0, including: 1 g of vanadium slag, 1.11 g of oxalic acid, and 10 mL of deionized water were added into a reaction kettle for a reaction at 80° C. for 90 min.

The results show that the vanadium slag has a vanadium leaching rate of 65.1%, a titanium leaching rate of 64.3%, and a chromium leaching rate of 48.5%.

Comparative Example 3

A method was the same as that of Comparative Example 2, except that vanadium slag after iron removal by hydrogen reduction was leached with oxalic acid.

The results show that the vanadium slag has a vanadium leaching rate of 99.4%, a titanium leaching rate of 99.3%, and a chromium leaching rate of 99.1%.

Specific examples are used herein to explain the principles and embodiments of the present disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. In conclusion, the content of the present description shall not be construed as limitations to the present disclosure.

What is claimed is:

1. A method for co-extraction of vanadium, titanium and chromium from vanadium slag, comprising the following steps:
   (1) subjecting vanadium slag to a reduction reaction in a high-temperature reaction furnace to obtain a reduction material, the reduction reaction being one selected from the group consisting of hydrogen reduction reaction and carbon monoxide reduction reaction;
   (2) conducting an iron removal reaction on the reduction material with a certain amount of a ferric chloride aqueous solution in a reaction kettle, and filtering, washing and drying after the reaction is completed to obtain an iron-removed product; and
   (3) conducting a leaching reaction on the iron-removed product with a certain amount of an oxalic acid solution in the reaction kettle, and filtering and washing after the reaction is completed to obtain a leaching solution and leaching residue of vanadium, titanium and chromium.

2. The method for co-extraction of vanadium, titanium and chromium from vanadium slag according to claim 1, wherein in step (1), the vanadium slag is one or two selected from the group consisting of high-grade vanadium slag and low-grade vanadium slag.

3. The method for co-extraction of vanadium, titanium and chromium from vanadium slag according to claim 1, wherein in step (1), the vanadium slag has a particle size of 100 mesh to 500 mesh.

4. The method for co-extraction of vanadium, titanium and chromium from vanadium slag according to claim 1, wherein in step (1), the reduction reaction is conducted at 600° C. to 1,000° C. for 30 min to 150 min.

5. The method for co-extraction of vanadium, titanium and chromium from vanadium slag according to claim 1, wherein the hydrogen reduction reaction has a hydrogen flow rate of 50 mL/min to 300 mL/min; and the carbon monoxide reduction reaction has a carbon monoxide flow rate of 70 mL/min to 400 mL/min.

6. The method for co-extraction of vanadium, titanium and chromium from vanadium slag according to claim 1, wherein in step (2), the ferric chloride aqueous solution has a concentration of 200 g/L to 600 g/L, and the ferric chloride aqueous solution and the reduction material have a liquid-to-material ratio of 4 mL:1 g to 10 mL:1 g; and the iron removal reaction is conducted at 50° C. to 90° C. and 200 r/min to 400 r/min for 30 min to 50 min.

7. The method for co-extraction of vanadium, titanium and chromium from vanadium slag according to claim 6, wherein in step (2), the ferric chloride aqueous solution has the concentration of 400 g/L to 500 g/L, and the ferric chloride aqueous solution and the reduction material have the liquid-to-material ratio of 4 mL:1 g to 10 mL:1 g; and the iron removal reaction is conducted at 60° C. to 70° C. and 350 r/min to 400 r/min for 30 min to 50 min.

8. The method for co-extraction of vanadium, titanium and chromium from vanadium slag according to claim 1, wherein in step (3), the oxalic acid solution has a concentration of 5% to 15%, and the oxalic acid solution and the iron-removed product have a liquid-to-material ratio of 4 mL:1 g to 10 mL:1 g; and the leaching reaction is conducted at 40° C. to 100° C., 0 MPa to 1 MPa and 100 r/min to 500 r/min for 30 min to 120 min.

9. The method for co-extraction of vanadium, titanium and chromium from vanadium slag according to claim 8, wherein in step (3), the oxalic acid solution has the concentration of 5% to 15%, and the oxalic acid solution and the iron-removed product have the liquid-to-material ratio of 6 mL:1 g to 8 mL:1 g; and the leaching reaction is conducted at 70° C. to 80° C., 0.1 MPa to 1 MPa and 300 r/min to 350 r/min for 30 min to 120 min.

* * * * *